No. 802,744. PATENTED OCT. 24, 1905.
W. J. FOISTER.
SPRING BOLSTER.
APPLICATION FILED FEB. 18, 1905.
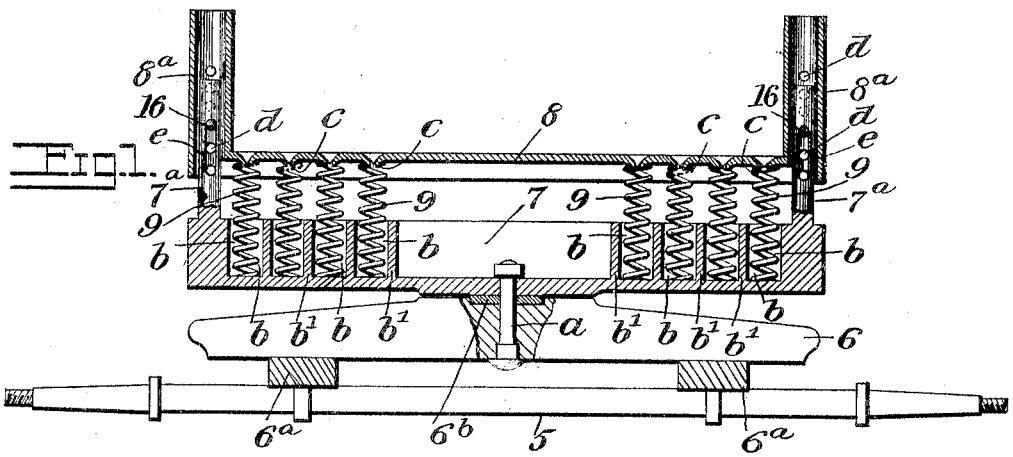
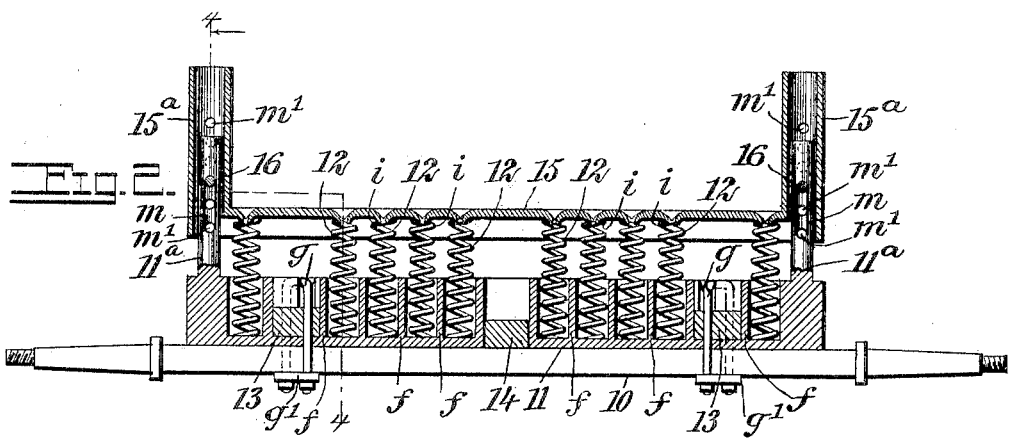
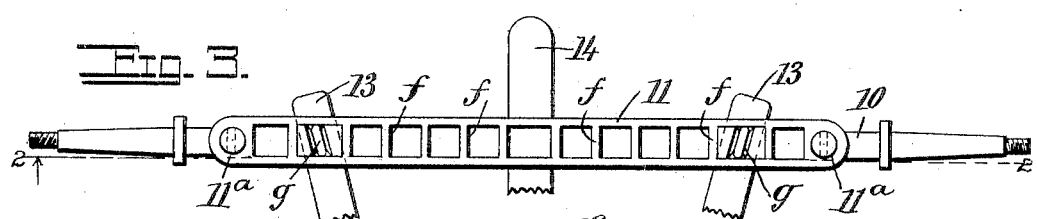
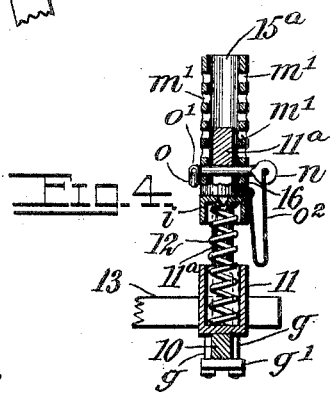
WITNESSES:
L. Almquist
Wm. P. Patton
INVENTOR
William J. Foister
BY Munn & Co
ATTORNEYS

UNITED STATES PATENT OFFICE.

WILLIAM JOHN FOISTER, OF MYRTLEPOINT, OREGON.

SPRING-BOLSTER.

No. 802,744.           Specification of Letters Patent.           Patented Oct. 24, 1905.

Application filed February 18, 1905. Serial No. 246,256.

*To all whom it may concern:*

Be it known that I, WILLIAM JOHN FOISTER, a subject of the King of Great Britain, and a resident of Myrtlepoint, in the county of Coos and State of Oregon, have invented a new and Improved Spring-Bolster, of which the following is a full, clear, and exact description.

This invention relates to springs employed for cushioning the impact of a load on a vehicle, such as a freight-hauling wagon, and has for its object to provide novel details of construction for the bolsters employed whereby springs are associated with the bolsters and adapted for absorbing shocks sustained by the loaded wagon in moving over a rough road-bed.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a rear view of the front axle of a vehicle, a transverse sectional view of the front hounds thereon, and a longitudinal sectional rear view of the improved spring-bolster as applied upon the front axle. Fig. 2 is a longitudinal sectional rear view of the improved spring-bolster substantially on the line 2 2 in Fig. 3, showing it mounted upon the rear axle of a vehicle. Fig. 3 is a plan view of the rear axle, rear hounds, a reach-pole, and the improved bolster mounted and secured upon the axle; and Fig. 4 is a transverse sectional view substantially on the line 4 4 in Fig. 2.

The details of improvement as embodied in the front and rear bolsters of a wagon are essentially the same, but differ from each other in the manner in which said bolsters are mounted upon and secured to the front and rear axles of a wheeled vehicle.

The front axle 5 is of any preferred construction, having a sand-bar or other bearing-bar 6 mounted thereon and having a pair of hounds $6^a$ secured between said parts 5 6 in any approved manner. The bolster for the front axle consists of two portions 7 and 8 that are both formed of metal cast into proper shape and respectively designated as a "body-piece" and a "cap-piece." The body-piece 7 is an elongated box-like structure having parallel sides and a post $7^a$ formed or secured vertically at each end thereof, said posts above the body-piece being preferably cylindrical.

At and near the center of the body-piece 7 a flat bearing-face is formed on the lower surface thereof, said bearing-face seating upon a wear-plate $6^b$, mounted upon the bearing-bar 6, and the body-piece is centrally pivoted upon the wear-plate and bearing-bar by a king-bolt $a$. The body-piece is open on the upper side and near each end is subdivided into a series of pockets $b$ of equal size by the transverse partitions $b'$, said pockets receiving each a coiled spring 9, that normally projects above the top edges of the pocket in which it is held.

The cap-piece 8 is in the form of a shallow inverted box rectangular in shape and having equal length and width with the body-piece 7. At each end a vertical hollow standard $8^a$ is formed or secured on the cap-piece 8, said standards respectively receiving a post $7^a$, the posts fitting loosely therein, thus adapting the cap-piece for vertical movement toward and from the body-piece 7.

Preferably the upper ends of the coiled springs 9 are secured upon collars $c$, formed upon the normally lower side of the cap-piece 8, said collars being positioned directly above respective springs, thus disposing the latter vertically and adapting them to press upwardly on the cap-piece. In each hollow standard $8^a$ a plurality of spaced perforations $d$ are formed transversely therethrough in the same vertical plane, and at a suitable point in each post $7^a$ a longitudinal slot $e$ is formed in the same vertical plane with the series of perforations $d$ in a respective hollow standard.

The bolster for the rear axle 10 is substantially the same in construction as the front bolster and comprises a hollow body-piece 11, having two parallel side walls that are joined together at their ends by two posts $11^a$, formed integrally therewith at the bases of said posts and erected vertically, as is shown in Fig. 2. The posts $11^a$ are cylindrical and preferably similar in dimensions to the posts $7^a$. The side walls of the bolster-body 11 are integrally connected together at suitable intervals by the transverse partition-walls $f$, that provide a plurality of spring-holding pockets, wherein are seated the lower portions of an equal number of coiled springs 12, which are similar to the springs 9 in dimensions and expansive force. Near each post $11^a$ a transverse slot is formed through the body of the bolster 11, just above the bottom wall thereof, these rectangular slots receiving end portions of the rear hounds 13, which are portions of the running-gear for the wagon. A similar transverse slot is formed in the bolster-body 11 at its center of length or equally distant from the hounds 13, said slot accommodating the rear end portion of the reach-pole 14, which is passed therethrough.

The flat bottom wall of the bolster-body 11 is seated upon the upper surface of the rear axle 10 and is thereon secured immovably by two looped clamping-bolts $g$, that respectively embrace the hounds 13 and, together with a clip-plate $g'$ for each looped bolt, clamp the bolster-body upon the axle, as is clearly shown in Fig. 2.

A cap-piece 15 is a completing portion of the two-part rear bolster and is essentially similar in form to the cap-piece 8, consisting of an inverted shallow rectangular box having at each end thereof a vertical hollow standard $15^a$, wherein a respective post $11^a$ is loosely fitted, thus adapting the cap-piece 15 to reciprocate in a plane parallel with the plane of the bolster-body 11. Upon the lower side of the cap-piece 15 and directly opposite each vertical spring 12 a collar $i$ is formed, whereon the upper ends of said springs are respectively mounted and secured. In each of the posts $11^a$ a longitudinal slot $m$ is formed, and in the same vertical plane with each slot $m$ a series of spaced perforations $m'$ is formed in each hollow standard $15^a$, the perforations $m'$ in each standard being preferably equal in number with like perforations in corresponding hollow standards $8^a$.

A keeper-bolt 16 is provided for each post and mating standard thereon, and, as is shown in Fig. 4, these keeper-bolts each is cylindrical in the body, has a laterally-flattened head $n$ on one end, and at the opposite end is furnished with a short finger $o$, that is pivoted thereupon, as shown at $o'$, so that the finger may be adjusted in alinement with the body of the bolt for free insertion through a perforation oppositely formed in the wall of a standard $8^a$ or $15^a$, and when the bolt is fully inserted it may be locked in place by turning the finger laterally, as shown in Fig. 4.

In service, assuming that the improved spring-bolsters are mounted upon the front and rear axles of a freight-wagon and that a suitable body is placed upon the cap-pieces of the bolsters, between the standards thereon, the weight of the load will obviously depress the springs 9 and 12, thus causing one or more transverse perforations in each standard $8^a$ $15^a$ to be disposed opposite a respective vertical slot in a corresponding post $7^a$ or $11^a$. The keeper-bolt 16 for each post and hollow standard thereon is now passed through the perforation in the standard that is nearest to the upper end of the slot in the post and is therein locked by turning the finger $o$ downward. It will be seen that this adjustment of the bolts permits them to slide down in the slots in the posts $7^a$ $11^a$, and thus adapts the springs in each bolster to absorb shocks resulting from the travel of the wagon over a rough road-bed, but will prevent an upward movement of the bolster cap-pieces and load carried thereon above the point of normal depression given to the cap-pieces and springs by the imposition of the load carried thereon. It will also be noted that when the wagon is traversing a road-bed that is low at one side the bolts 16 will prevent the springs on the high side of the road from rising improperly and imposing an excess of weight upon the springs above the lower side of the road.

As shown in Fig. 4, the head of each keeper-bolt 16 is connected by a chain or cord $o^2$ to a respective standard $8^a$ $15^a$, so as to prevent loss.

It is to be understood that the springs in the bolsters are to be proportioned in size and load-supporting strength to suit the capacity of the wagon or vehicle, as it is obvious that the improvement may be applied upon a coach, automobile, or light vehicle for carrying one or more persons and operate as efficiently as when employed to support a load on a freight-hauling wagon.

Having thus described my invention, I claim as new and desire to secure by Letters Patent—

1. A spring-bolster, comprising an elongated body, a post at each end of the body, pockets in the body, springs projecting from said pockets, a cap seated upon said springs, and hollow standards slidable on the posts.

2. A spring-bolster, comprising an elongated body, a post at each end of the body and having a slot longitudinally therein, a cap, springs between the body and the cap, hollow standards on the ends of the cap, said standards loosely receiving the posts when the cap is seated upon the springs, and transverse bolts engaging perforations in the posts and the slots in the standards.

3. A spring-bolster, comprising an elongated body embodying a flat bottom, parallel sides and a plurality of transverse partitions between said sides forming pockets, a plurality of coiled springs seated upon the flat bottom within the pockets, a cylindrical post on each end of the body, a box-like cap, collars on the lower side of the cap whereon the upper ends of the springs are secured, a hollow standard on each end of the cap and wherein the posts slide, and means for adjustably holding the cap and standards on the posts against the stress of the springs.

4. A spring-bolster, comprising an elongated body, a post on each end of said body, each post having a longitudinal slot therein, a plurality of pockets in the body, a coiled spring in each pocket, a cap having inverted-box form, a hollow standard on each end of the cap, a plurality of spaced perforations in each standard that may be registered with the slot in a respective post, collars on the lower side of the cap, whereon the upper ends of the springs are secured, and keeper-bolts each having a jointed finger on its free end, which may be inserted through a perforation and slot in an engaged post and standard, and be held by the lateral adjustment of the finger.

In testimony whereof I have signed my name to this specification in the presence of two subscribing witnesses.

WILLIAM JOHN FOISTER.

Witnesses:
 E. BENDER,
 C. H. BRAMLEY.